United States Patent
He

(10) Patent No.: US 9,389,356 B2
(45) Date of Patent: Jul. 12, 2016

(54) LED BACKLIGHT MODULE AND THE CORRESPONDING LIQUID CRYSTAL DISPLAY

(71) Applicant: Shenzhen China Star Optoelectronics Technology Co., Ltd., Shenzhen, Guangdong (CN)

(72) Inventor: Hu He, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 197 days.

(21) Appl. No.: 14/122,676

(22) PCT Filed: Oct. 18, 2013

(86) PCT No.: PCT/CN2013/085493
§ 371 (c)(1),
(2) Date: Nov. 26, 2013

(87) PCT Pub. No.: WO2015/051559
PCT Pub. Date: Apr. 16, 2015

(65) Prior Publication Data
US 2015/0098244 A1  Apr. 9, 2015

(30) Foreign Application Priority Data
Oct. 9, 2013 (CN) .......................... 2013 1 0466352

(51) Int. Cl.
*G02B 6/00* (2006.01)
*F21V 8/00* (2006.01)

(52) U.S. Cl.
CPC ............ *G02B 6/0075* (2013.01); *G02B 6/0036* (2013.01); *G02B 6/0051* (2013.01); *G02B 6/0061* (2013.01)

(58) Field of Classification Search
CPC .. G02B 6/0075; G02B 6/0078; G02B 6/0073; G02F 1/133615
See application file for complete search history.

(56) References Cited

U.S. PATENT DOCUMENTS

| | | | | |
|---|---|---|---|---|
| 5,506,929 | A * | 4/1996 | Tai et al. | 385/146 |
| 8,246,233 | B2 * | 8/2012 | Cornelissen et al. | 362/612 |
| 2007/0188677 | A1 * | 8/2007 | Souk et al. | G02B 6/0078 349/65 |
| 2008/0137328 | A1 * | 6/2008 | Lee et al. | 362/224 |
| 2009/0296373 | A1 * | 12/2009 | Chang | 362/97.1 |
| 2010/0103344 | A1 * | 4/2010 | Wang et al. | 349/61 |
| 2010/0165236 | A1 * | 7/2010 | Bae et al. | 349/58 |
| 2010/0208159 | A1 * | 8/2010 | Oan | 349/58 |
| 2010/0290248 | A1 * | 11/2010 | Park | 362/606 |
| 2011/0007238 | A1 * | 1/2011 | Kim | 349/61 |
| 2011/0013421 | A1 * | 1/2011 | Um | 362/612 |
| 2011/0096528 | A1 * | 4/2011 | Kim et al. | 362/97.1 |

* cited by examiner

*Primary Examiner* — Julie Bannan
(74) *Attorney, Agent, or Firm* — Andrew C. Cheng

(57) ABSTRACT

The present invention discloses a LED backlight module, which comprises a backplane; a side-type backlight source, which comprises a backlight source substrate and multiple light emitting diodes provided on the backlight light source substrate; a reflector, which is provided on the backplane; multiple light guides provided on the reflector in parallel, each light guide being provided with at least one light-incident surface and one light-emitting surface, the light-incident surface of the light guide being opposite to the LED; diffusers provided on the multiple light guides, which are opposite to the light-emitting surface of the light guide; and an optical film set, which is located above the diffuser. The embodiment of the present invention further discloses the corresponding liquid crystal display. According to the embodiment of the present invention, it can save the amount of LEDs, which is beneficial for the narrow frame of the liquid crystal display panel.

17 Claims, 4 Drawing Sheets

US 9,389,356 B2

LED BACKLIGHT MODULE AND THE CORRESPONDING LIQUID CRYSTAL DISPLAY

This application claims priority to Chinese Patent Application Serial No. 201310466352.1, named as "LED backlight module and the corresponding liquid crystal display", filed on Oct. 9, 2013, the specification of which is incorporated herein by reference.

BACKGROUND OF THE INVENTION

1. Field of the Invention

The present invention relates to the structure of thin film transistor liquid crystal display (TFT-LCD), and in particular to a LED backlight module and the corresponding liquid crystal display.

2. The Related Arts

Among the existing technology, light emitting diode (LED) is commonly used as the light source of TFT-LCD backlight because it has the advantage of high energy efficiency.

The schematic view illustrating the structure of the backlight module according to the prior art is shown in FIG. 1. The backlight module comprises: a backplane 10, a PCB plate 20 provided on the backplane 10, and a reflective plate 30. Wherein, multiple bottom lighting sources 40, which are as LED, are provided on the reflective plate 30, which is electrically connected to the reflective plate 30 through the PCB plate 20. The light emitted from bottom lighting source 40 is facing the optical film set 70.

In pace with the future development of the energy saving concept, the current TFT-LCD backlighting requires further energy saving. It is necessary to reduce the number of LEDs to achieve the reduction of power consumption. Nowadays, second lens technology is adopted to change the LED light pattern, thereby reducing the light mixing distance of the LED and also the number of LED usage. However, there is a bottleneck to further reduce the energy consumption.

With the progression of the technology, the light efficiency of LED is increasing. Moreover, the increase of the power of LED causes the increase of the flux enhancement of LED. The flux of single LED is very high when high power LED is used. Hence, under the same module specification, the number of LED usage can be reduced. However, in the bottom lighting LED backlight module structure, because the light intensity right above the LED is larger, and the light intensity within the LEDs is smaller, the chromatic aberration of LED (Mura) is more obvious.

However, in the structure of the side-type backlight module, it would produce significant hot spots when the number of LEDs is reduce because the light mixing distance between the LED and the light guide plate is limited. In order to solve such problems, the light mixing distance between the LED and the light guide plate is usually increased, which conflicts with the narrow frame of the liquid crystal display panel.

SUMMARY OF THE INVENTION

The technical issue to be solved by the present invention is to provide a LED backlight module and the corresponding liquid crystal display, which has good backlight and save the amount of LEDs.

In order to solve the technical issue, the embodiment according to the present invention provides a LED backlight module, at least comprising:

a backplane;
a side-type backlight source, which comprises a backlight source substrate and multiple light emitting diodes provided on the backlight source substrate;
a reflector, which is provided on the backplane;
multiple light guides provided on the reflector in parallel, each light guide being provided with at least one light-incident surface and one light-emitting surface, the light-incident surface of the light guide being opposite to the LED of the side-type backlight source, the light guide transforming the spot light emitted from the LED of the side-type backlight source into the line light, which is transmitted out from the light-emitting surface;
diffusers provided on the multiple light guides, which are opposite to the light-emitting surface of each light guide;
an optical film set, which is located above the diffuser.

Wherein, the light guide is a cuboid structure, the light-incident surface of each light guide is located on at least one end surface of the cuboid, the light-emitting surface is the upper surface of the cuboid, the upper surface of the cuboid is a plane or a prism structure parallel to the longitudinal direction of the cuboid; the multiple light guides are provided with an interval.

Wherein, the backplane comprises a vertical plate, the side-type backlight source is provided on the inner wall of the vertical plate, the end surface of the light guide facing the side-type backlight source provided on the inner wall of the vertical plate is the light-incident surface, and the end surface away from the side-type backlight source is affixed with a reflective film.

Wherein, the backplane comprises two vertical plates in parallel, the inner wall of each vertical plate is provided with the side-type backlight source, two ends of the light guide are provided as the light-incident surface, which respectively face the two side-type backlight sources.

Wherein, the bottom of each light guide is provided with multiple lattice points, the lattice points are used to reflect the spot light from the LED of the side-type backlight source to the light-emitting surface of the light guide and then transmit out.

Wherein, the lattice points are obtained by printing or injection molding, the lattice points are selected from the groups consisting of concave lattice points, convex lattice points, printing lattice points and V-shaped cutting groove lattice points.

Wherein, there is an interval between the two adjacent light guides.

Wherein, there is a predetermined light mixing distance between the light guide and the diffuser.

Correspondingly, another embodiment according to the present invention provides a LED backlight module, at least comprising:

a backplane;
a side-type backlight source, which comprises a backlight source substrate and multiple light emitting diodes provided on the backlight source substrate;
a reflector, which is provided on the backplane; multiple light guides provided on the reflector in parallel, each light guide being provided with at least one light-incident surface and one light-emitting surface, the light-incident surface of the light guide being opposite to the LED of the side-type backlight source, the light guide transforming the spot light emitted from the LED of the side-type backlight source into the line light, which is transmitted out from the light-emitting surface;
diffusers provided on the multiple light guides, which are opposite to the light-emitting surface of each light guide;

an optical film set, which is located above the diffuser;
wherein, the light guide is a cuboid structure, the light-incident surface of each light guide is located on at least one end surface of the cuboid, the light-emitting surface is the upper surface of the cuboid, the upper surface of the cuboid is a plane or a prism structure parallel to the longitudinal direction of the cuboid, the bottom of each light guide is provided with multiple lattice points, the lattice points are used to reflect the spot light from the LED of the side-type backlight source to the light-emitting surface of the light guide and then transmit out.

Wherein, the backplane comprises a vertical plate, the side-type backlight source is provided on the inner wall of the vertical plate, the end surface of the light guide facing the side-type backlight source provided on the inner wall of the vertical plate is the light-incident surface, and the end surface away from the side-type backlight source is affixed with a reflective film.

Wherein, the backplane comprises two vertical plates in parallel, the inner wall of each vertical plate is provided with the side-type backlight source, two ends of the light guide are provided as the light-incident surface, which respectively face the two side-type backlight sources.

Wherein, the lattice points are obtained by printing or injection molding, the lattice points are selected from the groups consisting of concave lattice points, convex lattice points, printing lattice points and V-shaped cutting groove lattice points.

Wherein, there is an interval between the two adjacent light guides.

Wherein, there is a predetermined light mixing distance between the light guide and the diffuser.

Correspondingly, another embodiment according to the present invention further provides a liquid crystal display, which comprises the LED backlight module mentioned above.

The present invention has the beneficial effects as follow. By the cooperation of the LED and the light guide, it can ensure the quality of LED backlight module under the premise of reducing the amount of LEDs; the spot light emitted from the LED can be transformed into the line light, and then be transformed into the surface light through the diffuser, which can display uniform light under the premise of reducing the amount of LEDs; by the cooperation of the light guide and the diffuser, it can reduce the light mixing distance between the LED and the light guide, which can achieve very good backlight and is beneficial for the narrow frame of the liquid crystal display panel.

BRIEF DESCRIPTION OF THE DRAWINGS

In order to more clearly illustrate the embodiment of the present invention or the technical issue of the prior art, the accompanying drawings and the detailed descriptions are as follows. Obviously, the following description of the accompanying drawings are only some embodiments according to the present invention, for persons of ordinary skill in this field, they can also obtain other drawings based on these drawings without creative effort.

DETAILED DESCRIPTION OF THE PREFERRED EMBODIMENTS

The detailed descriptions accompanying drawings and the embodiment of the present invention are as follows.

Figure 1:
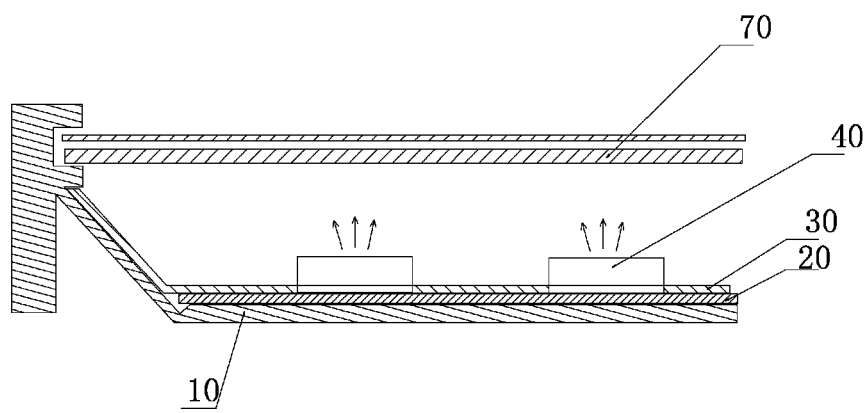
FIG. 1 is a schematic view illustrating the structure of the backlight module according to the prior art.
Figure 2:
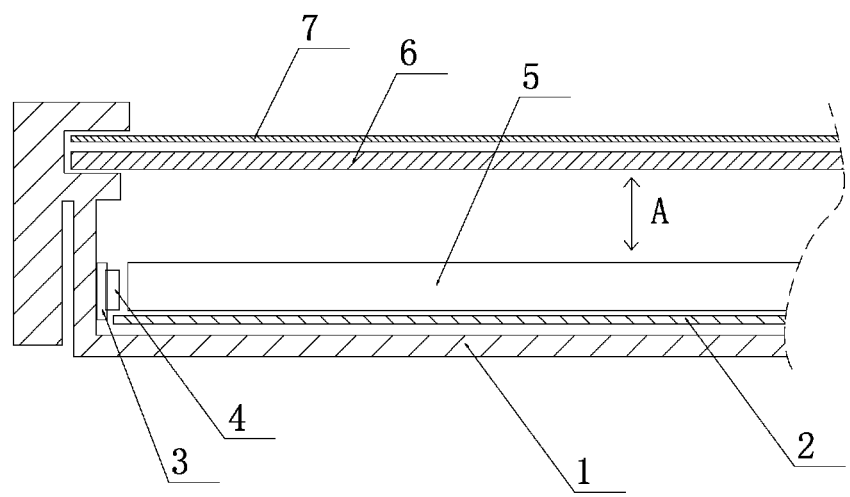
FIG. 2 is a schematic view illustrating the structure of the LED backlight module according to the present invention.
Figure 3:
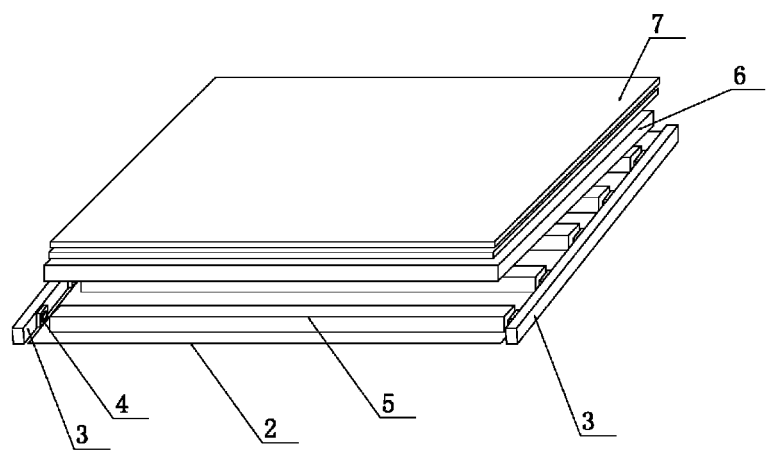
FIG. 3 is a exploded view illustrating the partial structure of the LED backlight module according to one embodiment of the present invention.

Referring to FIGS. 2 and 3, it shows a LED backlight module according to one embodiment of the present invention. In the LED backlight module according to the embodiment, it at least comprises:

a backplane 1, the backplane 1 comprising a horizontal plate and at least one vertical plate extending from the horizontal plate;

a side-type backlight source, which is provided on the inner wall of the vertical plate of the backplane 1, the side-type backlight source comprising a backlight source substrate 3 and multiple light emitting diodes provided on the backlight source substrate 3; wherein, the backlight source substrate 3 can be printed circuit board (PCB) fixed on the vertical plate of the backplane 1, and the incident light is emitted in either unilateral way or bilateral way; if it is emitted in bilateral way, the backplane 1 needs to having two vertical plates in parallel, the inner wall of each vertical plate is provided with the side-type backlight source;

a reflector 2, which is provided on the backplane 1, used to reflect the light upward;

multiple light guides 5 provided in parallel, the multiple light guides 5 being provided on the reflector 2 in an interval, each light guide 5 being provided with at least one light-incident surface 50 and one light-emitting surface 51, the light-incident surface 50 of the light guide 5 being opposite to the LED 4 of the side-type backlight source, which is used to receive the light source emitted from the LED 4 and the transmit; the light guide 5 transforming the spot light emitted from the LED 4 of the side-type backlight source into the line light, which is transmitted out from the light-emitting surface 51; wherein, the light guide 5 is a cuboid structure, the light-incident surface 50 of each light guide 5 is located on at least one end surface of the cuboid, the light-emitting surface 51 is the upper surface of the cuboid, the upper surface of the cuboid is a plane or a prism structure parallel to the longitudinal direction of the cuboid (not shown); moreover, the multiple light guides 5 are provided with an interval, that is, there is an interval between two adjacent light guides 5;

diffusers 6 provided on the multiple light guides 5, which are opposite to the light-emitting surface 51 of each light guide 5, used to atomize and mix the line light emitted from the multiple light guides 5, forming uniform surface light;

an optical film set 7, which is located above the diffuser 6; wherein, the optical film set 7 can comprise a prism sheet, which can make the emitting light from the light-emitting surface 51 of the light guide 5 more uniform and improve the front-side luminance of the light.

In order to achieve better effects, there is a predetermined light mixing distance between the light guide 5 and the diffuser 6, the light mixing distance is according to the size of the liquid crystal display.

Figure 4:
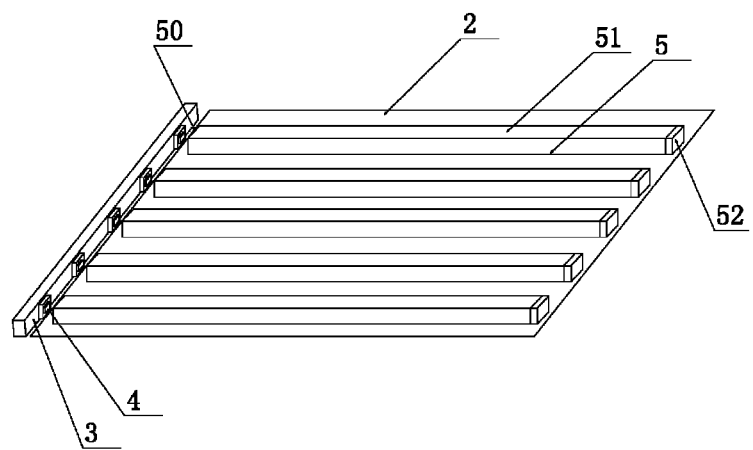
FIG. 4 is a schematic view illustrating the cooperation of the side-type backlight source and the light guide in the LED backlight module according to one embodiment of the present invention.

Referring to FIG. 4, it is a schematic view illustrating the cooperation of the side-type backlight source and the light guide in the LED backlight module according to one embodiment of the present invention. In the embodiment, it shows the unilaterally emitting structure. The backplane 1 only comprises a vertical plate due to unilaterally emitting. The end surface of the light guide 5 facing the side-type backlight source provided on the inner wall of the vertical plate is the light-incident surface 50, and the end surface away from the side-type backlight source is affixed with a reflective film 52, which prevents the light transmitting out from the end, so that as much light can be transmitted from the light-emitting surface of the light guide 5.

Figure 5:
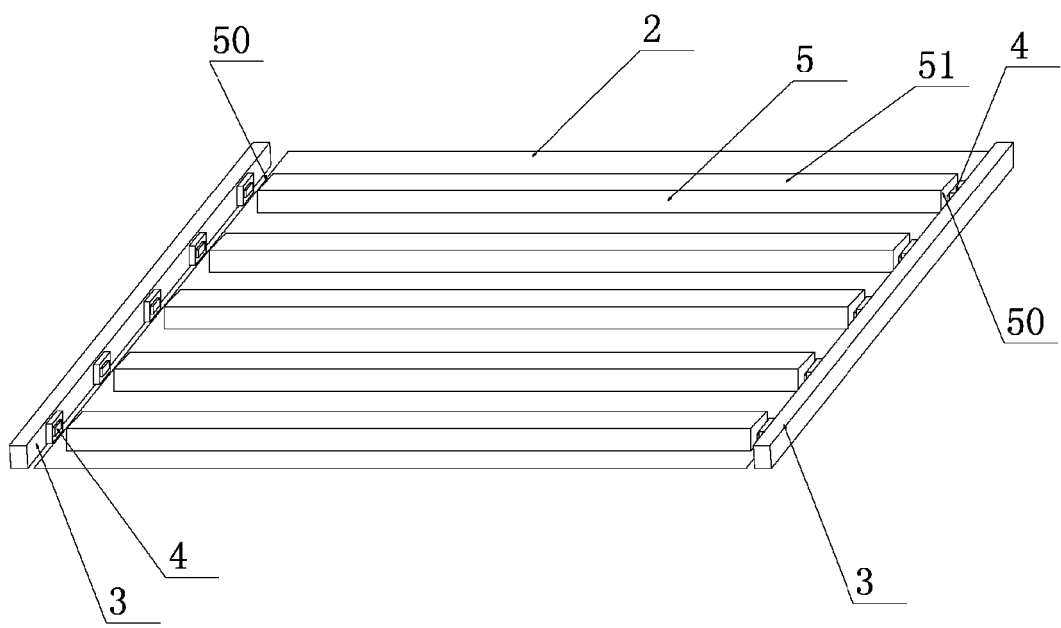
FIG. 5 is a schematic view illustrating the cooperation of the side-type backlight source and the light guide in the LED backlight module according to another embodiment of the present invention.
Figure 6:
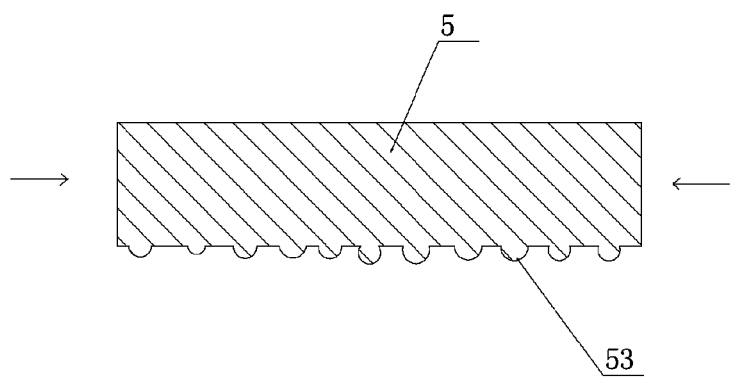
FIGS. 6 to 9 are schematic views illustrating the cross-sectional structure of the LED backlight module according to four embodiments of the present invention.
Figure 7:
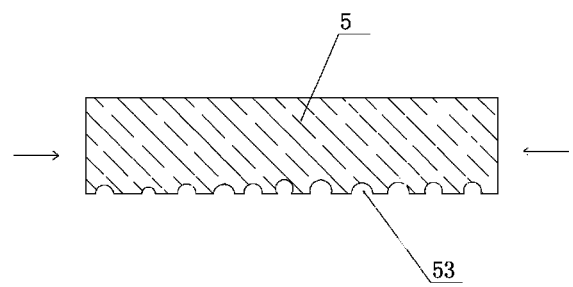
Figure 8:
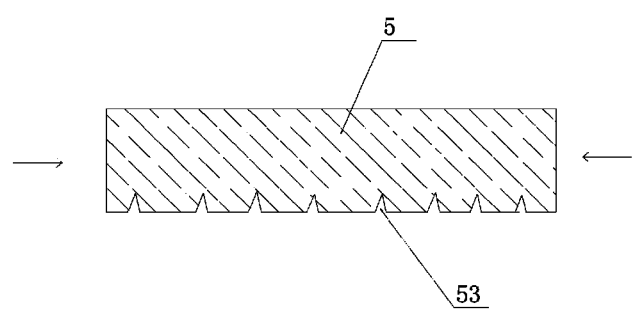
Figure 9:
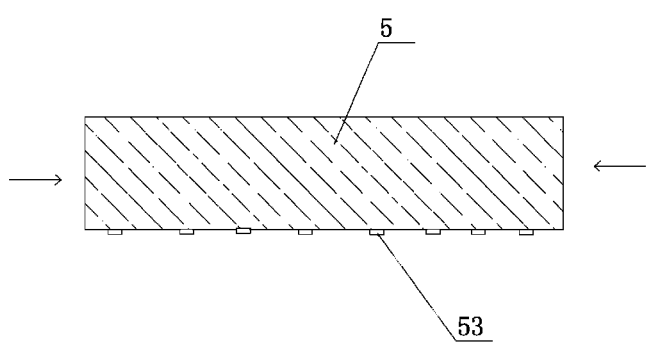

Referring to FIG. 5, it is a schematic view illustrating the cooperation of the side-type backlight source and the light guide in the LED backlight module according to another embodiment of the present invention. In the embodiment, it shows a bilaterally emitting structure. The backplane 1 comprises two vertical plates in parallel due to bilaterally emitting. The inner wall of each vertical plate is provided with the side-type backlight source. Two ends of the light guide 5 are provided as the light-incident surface 50, which respectively face the two side-type backlight sources.

In order to make the transmitted light in the light guide 5 can be emitted out from the light-emitting surface 51 of the light guide 5 uniformly. The bottom of each light guide 5 needs to be provided with multiple lattice points 53. The lattice points 53 are used to reflect the spot light from the LED 4 of the side-type backlight source to the light-emitting surface 51 of the light guide 5 and then transmit out. Specifically, the lattice points 53 can destroy the total internal reflection of the light in the light guide 5 and then transmit the light out from the light-emitting surface 51 uniformly. Referring to FIGS. 6 to 9, they are schematic views illustrating the cross-sectional structures of several light guides 5. The lattice points 53 shown in Figure can be obtained by printing or injection molding. Wherein, the lattice points 53 are selected from the groups consisting of concave lattice points, convex lattice points, printing lattice points and V-shaped cutting groove lattice points.

The working principle of the above embodiments of the present invention is as follows.

The LED 4 acts as backlight source, which is fixed on the backplane 1 through the backlight source substrate 3. The light emitted from the LED 4 is guided into the light-incident surface 50 of the light guide 5. The light guide 5 transmits the light, which emits from the light-emitting surface 51 of the light guide 5 as the line light under the effects of the bottom lattice points 53. The light emitted from the multiple light guides 5 becomes uniform surface light through the optical operation of the diffuser 6 and the optical film set 7, which provides the backlight for the liquid crystal module.

Correspondingly, the embodiment of the present invention further provides a liquid crystal display, which comprises the LED backlight module disclosed in FIGS. 2 to 9.

The present invention has the beneficial effects as follow. By the cooperation of the LED and the light guide, it can ensure the quality of LED backlight module under the premise of reducing the amount of LEDs; the spot light emitted from the LED can be transformed into the line light, and then be transformed into the surface light through the diffuser, which can display uniform light under the premise of reducing the amount of LEDs; by the cooperation of the light guide and the diffuser, it can reduce the light mixing distance between the LED and the light guide, which can achieve very good backlight and is beneficial for the narrow frame of the liquid crystal display panel.

The preferred embodiments according to the present invention are mentioned above, which cannot be used to define the scope of the right of the present invention. Those modifications and variations are considered encompassed in the scope of protection defined by the claims of the present invention.

What is claimed is:

1. A light-emitting diode (LED) backlight module, comprising:
    a backplane having a horizontal plate and a vertical plate extending from the horizontal plate;
    a side-type backlight source, which comprises a backlight source substrate and multiple LEDs provided on the backlight source substrate;
    a reflector, which is provided on the horizontal plate of the backplane;
    multiple light guides provided on the reflector and parallel with each other, each light guide being provided with at least one light-incident surface and one light-emitting surface, the light-incident surface of the light guide being opposite to one of the LEDs of the side-type backlight source, the light guide transforming spot light emitted from the LED of the side-type backlight source into line light, which is transmitted out from the light-emitting surface;
    a diffuser, which is provided above the multiple light guides and opposite to the light-emitting surface of each light guide; and
    an optical film set, which is located above the diffuser;
    wherein the LEDs of the side-type backlight source that are mounted on the backlight source substrate are spaced from each other and respectively corresponding to the light guides so that the LEDs are separate from and respectively corresponding to the light-incident surfaces of the light guides; and
    wherein the diffuser is supported on a step formed in the vertical plate and spaced from the horizontal plate such that the diffuser is spaced from the light-emitting surfaces of the light guides by a light mixing distance.

2. The LED backlight module as claimed in claim 1, wherein the light guide is a cuboid structure, the light-incident surface of each light guide is located on at least one end surface of the cuboid, the light-emitting surface is the upper surface of the cuboid, the upper surface of the cuboid is a plane or a prism structure parallel to the longitudinal direction of the cuboid; the multiple light guides are provided with an interval.

3. The LED backlight module as claimed in claim 2, wherein the side-type backlight source is provided on an inner wall of the vertical plate, and wherein the end surface of each of the light guides facing the side-type backlight source provided on the inner wall of the vertical plate is the light-incident surface and the end surface away from the side-type backlight source is affixed with a reflective film.

4. The LED backlight module as claimed in claim 2, wherein the backplane comprises two vertical plates in parallel, the inner wall of each vertical plate is provided with the side-type backlight source, two ends of the light guide are provided as the light-incident surface, which respectively face the two side-type backlight sources.

5. The LED backlight module as claimed in claim 3, wherein the bottom of each light guide is provided with multiple lattice points, the lattice points are used to reflect the spot light from the LED of the side-type backlight source to the light-emitting surface of the light guide and then transmit out.

6. The LED backlight module as claimed in claim 5, wherein the lattice points are obtained by printing or injection molding, the lattice points are selected from the groups consisting of concave lattice points, convex lattice points, printing lattice points and V-shaped cutting groove lattice points.

7. The LED backlight module as claimed in claim 6, wherein there is an interval between the two adjacent light guides.

8. A light-emitting diode (LED) backlight module, comprising:
   a backplane having a horizontal plate and a vertical plate extending from the horizontal plate;
   a side-type backlight source, which comprises a backlight source substrate and multiple LEDs provided on the backlight source substrate;
   a reflector, which is provided on the horizontal plate of the backplane;
   multiple light guides provided on the reflector and parallel with each other, each light guide being provided with at least one light-incident surface and one light-emitting surface, the light-incident surface of the light guide being opposite to one of the LEDs of the side-type backlight source, the light guide transforming spot light emitted from the LED of the side-type backlight source into line light, which is transmitted out from the light-emitting surface;
   a diffuser, which is provided above the multiple light guides and opposite to the light-emitting surface of each light guide; and
   an optical film set, which is located above the diffuser;
   wherein the light guide is a cuboid structure, the light-incident surface of each light guide is located on at least one end surface of the cuboid, the light-emitting surface is the upper surface of the cuboid, the upper surface of the cuboid is a plane or a prism structure parallel to the longitudinal direction of the cuboid, the bottom of each light guide is provided with multiple lattice points, the lattice points are used to reflect the spot light from the LED of the side-type backlight source to the light-emitting surface of the light guide and then transmit out;
   wherein the LEDs of the side-type backlight source that are mounted on the backlight source substrate are spaced from each other and respectively corresponding to the light guides so that the LEDs are separate from and respectively corresponding to the light-incident surfaces of the light guides; and
   wherein the diffuser is supported on a step formed in the vertical plate and spaced from the horizontal plate such that the diffuser is spaced from the light-emitting surfaces of the light guides by a light mixing distance.

9. The LED backlight module as claimed in claim 8, wherein the side-type backlight source is provided on an inner wall of the vertical plate, and wherein the end surface of the light guide facing the side-type backlight source provided on the inner wall of the vertical plate is the light-incident surface and the end surface away from the side-type backlight source is affixed with a reflective film.

10. The LED backlight module as claimed in claim 9, wherein the backplane comprises two vertical plates in parallel, the inner wall of each vertical plate is provided with the side-type backlight source, two ends of the light guide are provided as the light-incident surface, which respectively face the two side-type backlight sources.

11. The LED backlight module as claimed in claim 9, wherein the lattice points are obtained by printing or injection molding, the lattice points are selected from the groups consisting of concave lattice points, convex lattice points, printing lattice points and V-shaped cutting groove lattice points.

12. The LED backlight module as claimed in claim 11, wherein there is an interval between the two adjacent light guides.

13. A liquid crystal display, comprising a light-emitting diode (LED) backlight module, which comprises:
   a backplane having a horizontal plate and a vertical plate extending from the horizontal plate;
   a side-type backlight source, which comprises a backlight source substrate and multiple LEDs provided on the backlight source substrate;
   a reflector, which is provided on the horizontal plate of the backplane;
   multiple light guides provided on the reflector and parallel with each other, each light guide being provided with at least one light-incident surface and one light-emitting surface, the light-incident surface of the light guide being opposite to one of the LEDs of the side-type backlight source, the light guide transforming spot light emitted from the LED of the side-type backlight source into line light, which is transmitted out from the light-emitting surface;
   a diffuser, which is provided above the multiple light guides and opposite to the light-emitting surface of each light guide; and
   an optical film set, which is located above the diffuser;
   wherein the light guide is a cuboid structure, the light-incident surface of each light guide is located on at least one end surface of the cuboid, the light-emitting surface is the upper surface of the cuboid, the upper surface of the cuboid is a plane or a prism structure parallel to the longitudinal direction of the cuboid, the bottom of each light guide is provided with multiple lattice points, the lattice points are used to reflect the spot light from the LED of the side-type backlight source to the light-emitting surface of the light guide and then transmit out;
   wherein the LEDs of the side-type backlight source that are mounted on the backlight source substrate are spaced from each other and respectively corresponding to the light guides so that the LEDs are separate from and respectively corresponding to the light-incident surfaces of the light guides; and
   wherein the diffuser is supported on a step formed in the vertical plate and spaced from the horizontal plate such that the diffuser is spaced from the light-emitting surfaces of the light guides by a light mixing distance.

14. The liquid crystal display as claimed in claim 13, wherein the side-type backlight source is provided on an inner wall of the vertical plate, and wherein the end surface of the light guide facing the side-type backlight source provided on the inner wall of the vertical plate is the light-incident surface and the end surface away from the side-type backlight source is affixed with a reflective film.

15. The liquid crystal display as claimed in claim 13, wherein the backplane comprises two vertical plates in parallel, the inner wall of each vertical plate is provided with the side-type backlight source, two ends of the light guide are provided as the light-incident surface, which respectively face the two side-type backlight sources.

16. The liquid crystal display as claimed in claim 13, wherein the lattice points are obtained by printing or injection molding, the lattice points are selected from the groups consisting of concave lattice points, convex lattice points, printing lattice points and V-shaped cutting groove lattice points.

17. The liquid crystal display as claimed in claim 16, wherein there is an interval between the two adjacent light guides.

* * * * *